United States Patent [19]

Ferdows

[11] Patent Number: 4,835,982

[45] Date of Patent: Jun. 6, 1989

[54] EVAPORATIVE COOLING SYSTEM

[75] Inventor: Houshang Ferdows, Boulder, Colo.

[73] Assignee: Suetrak Air Conditioning Sales Corporation, Commerce City, Colo.

[21] Appl. No.: 902,673

[22] Filed: Sep. 2, 1986

[51] Int. Cl.$^4$ .............................................. B60H 1/32
[52] U.S. Cl. ...................................... 62/239; 62/310; 62/298
[58] Field of Search ................ 62/304, 309, 310, 298; 98/2.14, 2.15, 2.11; 261/80

[56] References Cited

U.S. PATENT DOCUMENTS 3,606,982 9/1971 Anderson ...................... 98/2.11 X
4,094,935 6/1978 Walker et al. ...................... 98/2.14
4,672,818 6/1987 Roth .

Primary Examiner—Henry A. Bennett
Attorney, Agent, or Firm—John E. Reilly

[57] ABSTRACT

An evaporative cooling unit is mounted on the roof of a vehicle wherein a plurality of air blowers are arranged in tendem to deliver cooled air through discharge ducts communicating with the interior of the motor vehicle. The cooling components are mounted in an improved housing of elongated low-profile configuration to extend lengthwise of the vehicle roof and has a base panel conforming to the contour of the roof including ribs defining raised mounting pads projecting upwardly from the base to form interruptions therein. Blowers include ribs with attachments for mounting in spaced relation to the roof, and internal frames in the housing define supports cooperating with the ribs to rigidly mount the blowers in the housing.

17 Claims, 4 Drawing Sheets

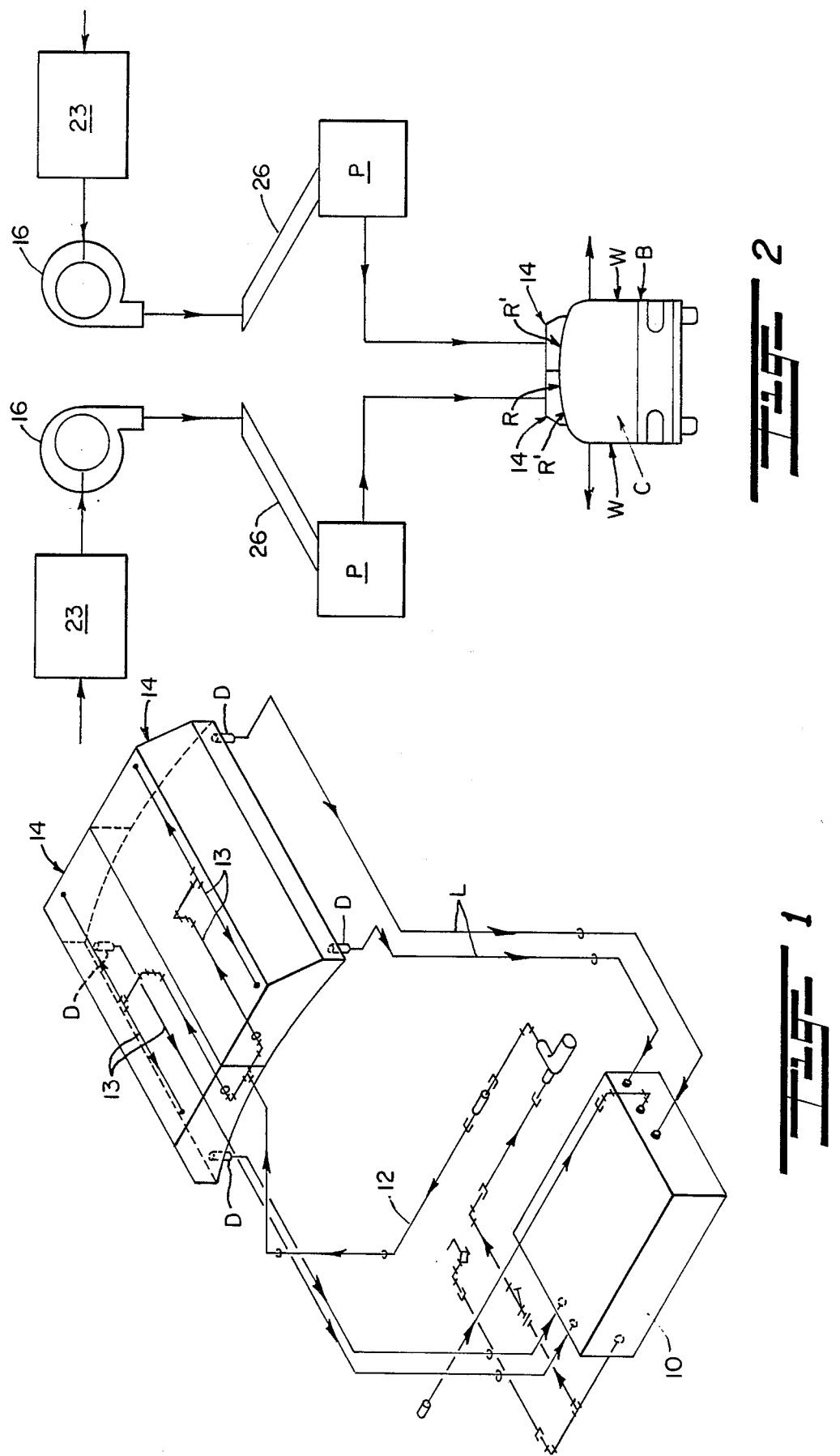

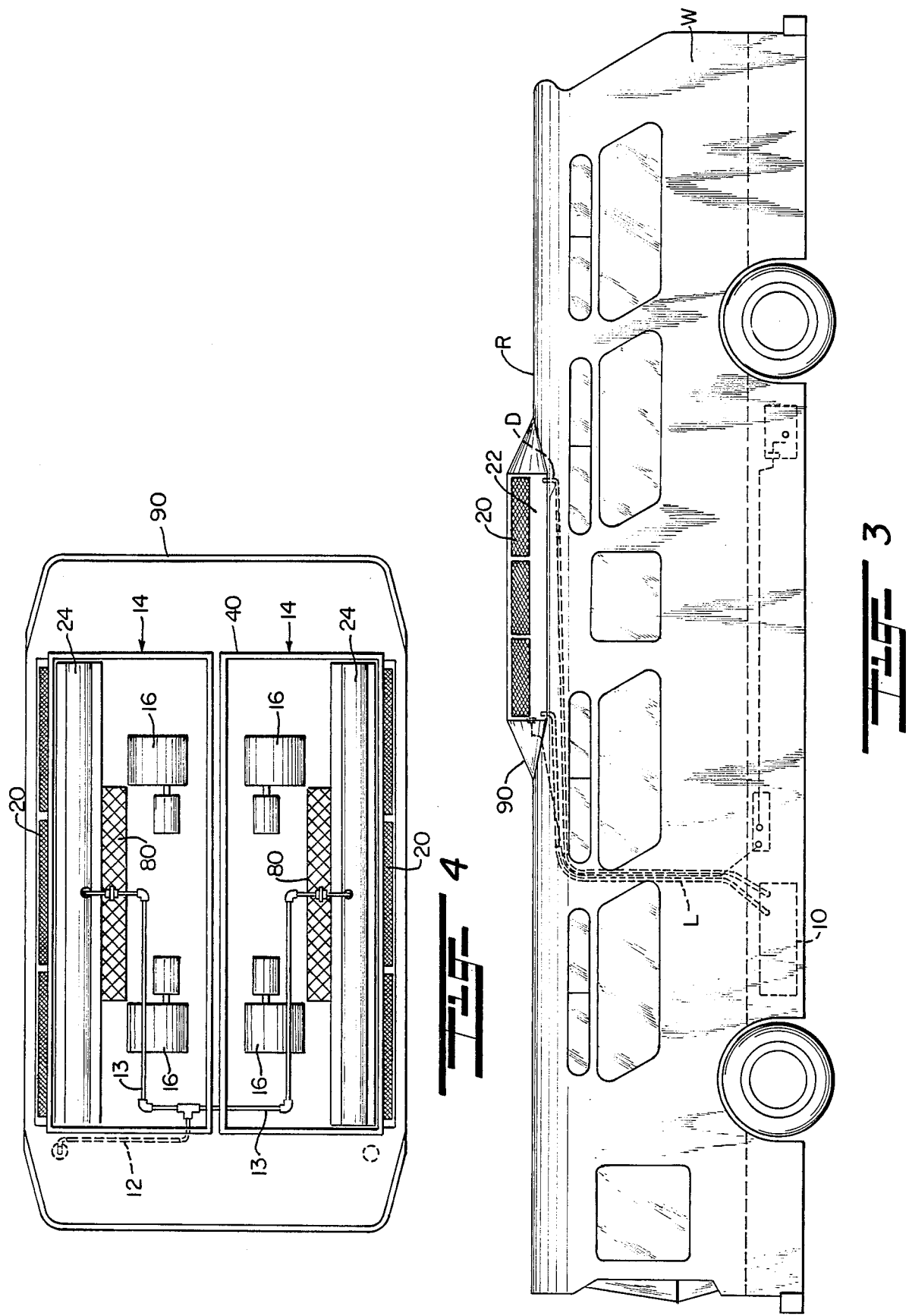

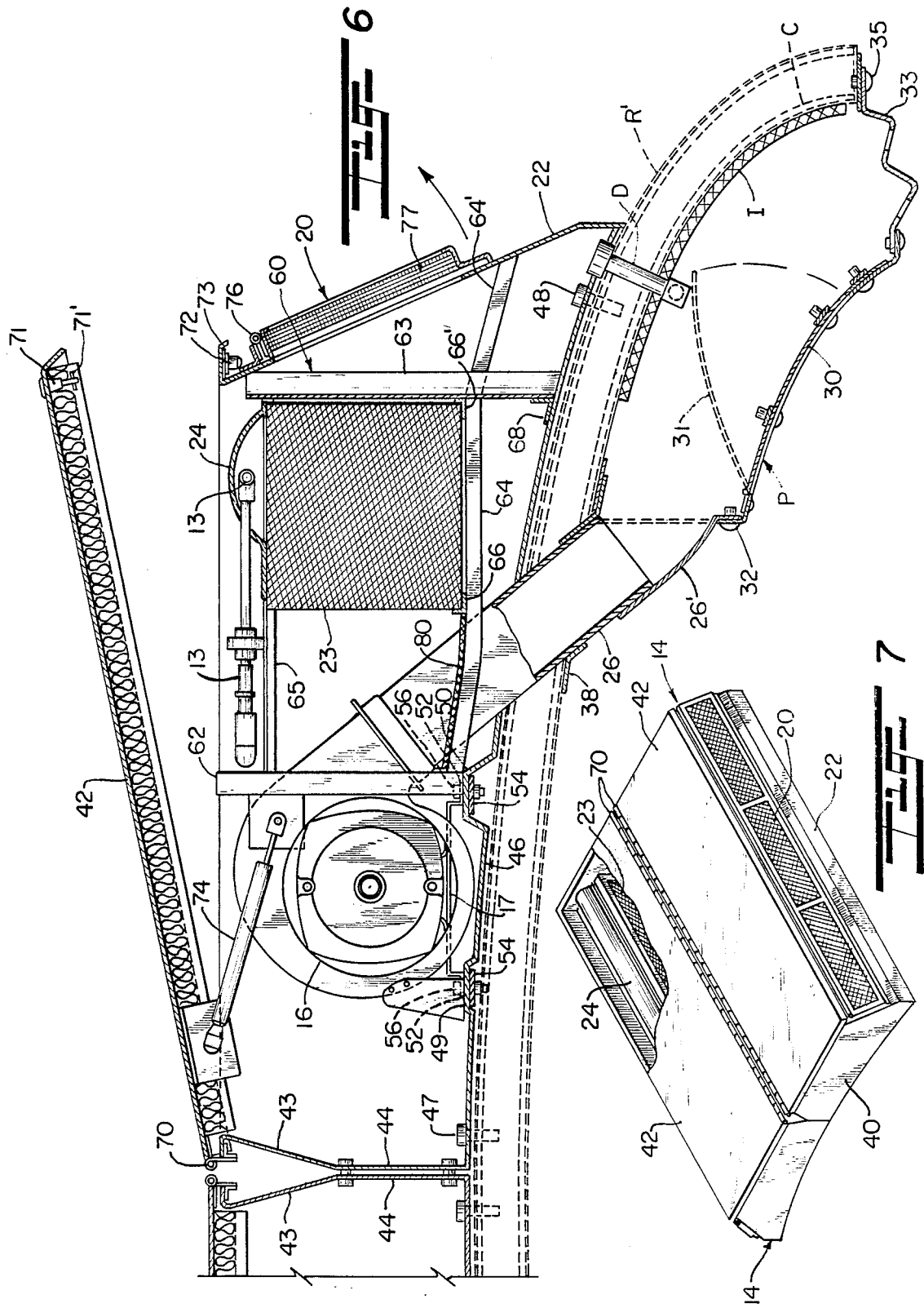

EVAPORATIVE COOLING SYSTEM

This invention relates to air cooling systems, and more particularly relates to a novel and improved roof-mounted, low-profile evaporative cooling system of the modular type for large motor vehicles, such as, buses.

BACKGROUND AND FIELD OF THE INVENTION

Evaporative cooling systems are used to cool spaces by distributing water over a media filter and drawing air through the media filter with a blower so as to lower the temperature of the air as the water evaporates. It has been proposed in the past to employ roof-mounted evaporative cooling systems for large motor vehicles, such as, buses as an efficient means of lowering the temperature of the passenger area. One approach taken in the past has been to employ a pair of housings in side-by-side relation, each housing containing a series of blowers mounted in tandem, a filter block extending lengthwise and in closely-spaced parallel relation to the blowers, and a diffuser for discharging water from a circulating tank into the filter block. Each filter block soaks up water from the diffuser and spreads the water uniformly throughout so that the air, when drawn across the filter block, will pick up moisture and cool the air preliminary to discharge through downwardly directed ducts extending from the discharge or exhaust sides of the blowers into the interior of the bus.

Numerous problems have been encountered in roof-mounted evaporative cooling systems of the type described: The cooled air was directed downwardly through the center of the bus or to the outside but still in a substantially vertical direction and did not afford even circulation; the blowers were mounted in a housing which in turn was directly bolted into the roof of the bus creating severe leakage problems as well as problems of vibration and noise transmitted by the blowers through the roof of the bus; the internal reinforcing of the filter block and blower were insufficient to overcome the vibration and noise problem and there was a tendency for the excess water which seeped out from the filter block to be splashed back toward the center or blower section, for example, when the bus negotiated a turn or curve. Other problems were experienced with the relative difficulty of removal of the filter blocks for cleaning purposes.

Representative of approaches taken in the past are disclosed in U.S. Pat. Nos. 2,784,568 to H. O. Schjolin; 2,404,961 to G. C. Hoch; 4,186,546 to M. Myers; and 4,201,064 to Martin Krug et al; as well as the *Operator's Manual for Sutrak Evaporative Cooling System for RTD Buses*, (Raymond, David L.) and the publication entitled "Transit-Aire" (Norsaire Corporation, 1983).

SUMMARY OF THE INVENTION

Accordingly, it is an object of the present invention to provide for a novel and improved air cooling or handling system for motor vehicles.

Another object of the present invention is to provide for a novel and improved air cooling system for motor vehicles, such as, buses in which the cooling elements are securely mounted in self-contained, low-profile housings affixed to the roof of the motor vehicle; and further wherein the system is specifically adaptable for mounting on and effective cooling of large passenger buses so as to substantially reduce the cost of operation and avoid the use of objectionable refrigerants of standard air conditioning systems.

A further object of the present invention is to provide for a novel and improved evaporative cooling system for buses in which the principal cooling elements of the system are mounted in one or more self-contained, low-profile, elongated housings affixed to the roof of the bus in such a manner as to effectively isolate the vibration and noise of the system from the interior of the bus while most uniformly circulating cooled air throughout the interior of the bus; and further wherein access can be gained to each housing independently of the others.

An additional object of the present invention is to provide in an evaporative cooling system for motor vehicles and the like for a novel and improved, lightweight, low-profile modular housing to facilitate mounting of the evaporative cooling components on the roof of the motor vehicle in such a way as to effectively minimize vibration and noise being transmitted from the housing to the interior of the motor vehicle as well as to minimize splashing or sloshing of any liquid in the housing when the motor vehicle is in motion.

The present invention has particular utility in an air cooling unit mounted on the roof of a vehicle wherein a plurality of air blowers are arranged in tandem to deliver cooled air through discharge ducts communicating with the interior of the motor vehicle. The cooling components are mounted in an improved housing, the housing being of elongated low-profile configuration and mounted on the roof of the motor vehicle to extend lengthwise thereof, the housing having a base panel conforming to the contour of the roof and including rib members defining raised mounting pads projecting upwardly from the base in forming interruptions therein, the blowers including attaching means affixed to the ribs so as to be mounted in spaced relation to the roof, and internal frame members in the housing define supporting means cooperating with the ribs in rigidly mounting the blowers within the housing. In a preferred embodiment of the invention, the air cooling unit is an evaporative cooling system in which a filter block medium extends lengthwise of the housing in spaced parallel relation to the blowers, and a diffuser element circulates water from a circulating tank to maintain the filter block in a saturated condition so that the blowers will draw air laterally from an open side of the housing through the filter block to increase the moisture content and to cool the air as a preliminary to discharge from the exhaust side of the blowers into the interior of the motor vehicle. The exhaust side of the blower is directed diagonally in a downward direction through the base of the housing and the roof of the motor vehicle into an interior manifold which circulates the discharged air throughout the motor vehicle, the duct being so mounted as to effectively insulate it from the mounting of the blower and minimize any noise from operation of the blower being transmitted into the interior of the motor vehicle. When used in connection with large motor vehicles, such as, buses it is desirable to employ a pair of housings arranged in side-by-side relation each containing the necessary components including the blowers, filter block medium and diffusers with internal framework to rigidify the mounting of the blowers and filter block, and a splash screen is provided to minimize splashing of any excess water away from a drain area.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a schematic illustration of the evaporative cooling supply and drainage system employed in the system of the present invention;

FIG. 2 is another schematic illustration of the air flow and circulation for a conventional passenger bus;

FIG. 3 is a front elevational view illustrating the preferred form of evaporative cooling system mounted on a passenger bus;

FIG. 4 is an enlarged plan view of the cooling system illustrated in FIG. 3;

FIG. 6 is a cross-sectional view of the preferred form of evaporative cooling system of the present invention; and FIG. 7 is a perspective view with portions broken away of the preferred form of evaporative cooling system in accordance with the present invention.

DETAILED DESCRIPTION OF THE PREFERRED EMBODIMENT

Figure 5:
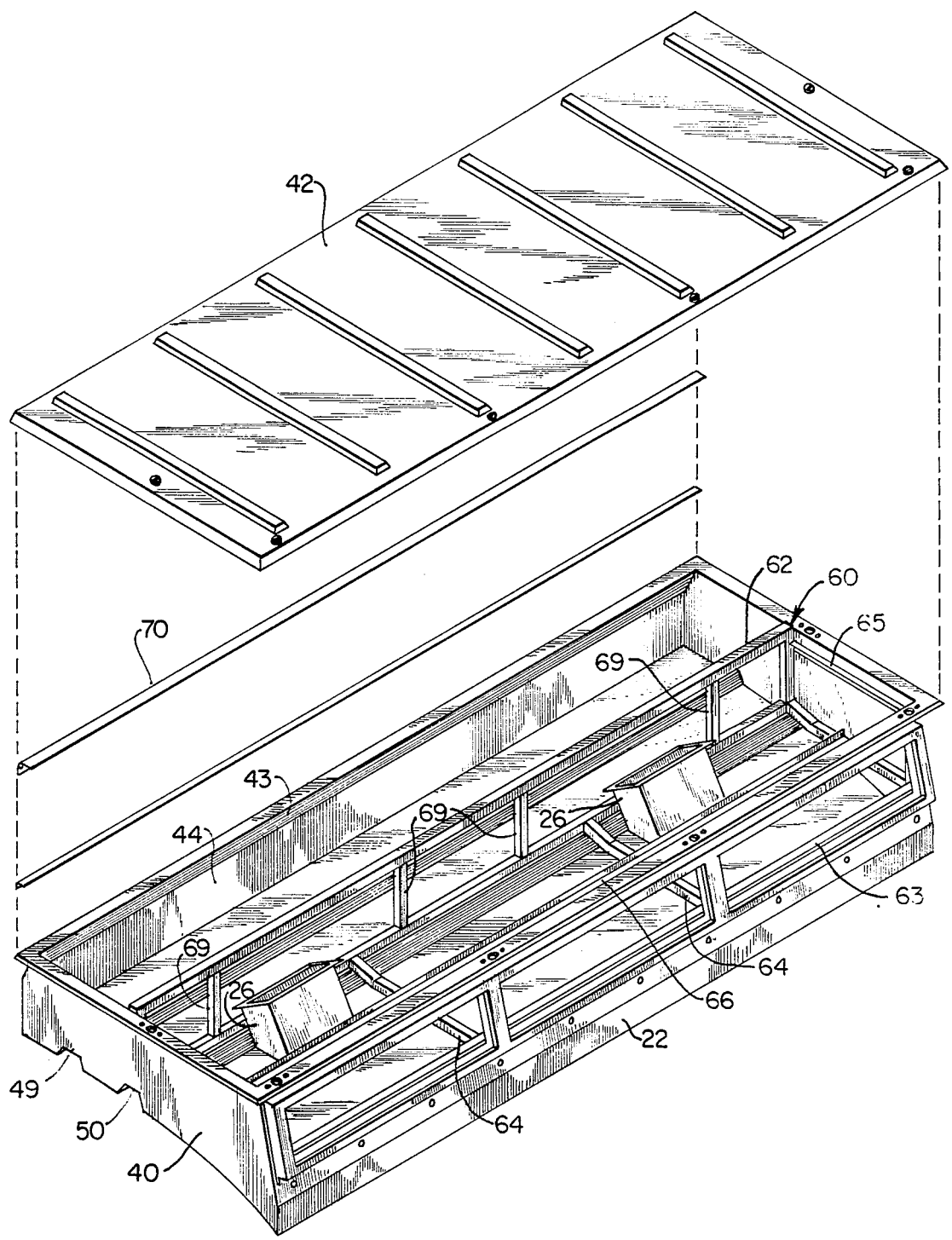
FIG. 5 is an exploded view of one of the evaporative cooling compartments and framework employed in the cooling system of the present invention.

As a setting for the present invention, the preferred embodiment thereof as illustrated is specifically adapted for use with a standard passenger bus B. The bus conventionally includes an interior passenger compartment C and a roof R having sloped roof portions R' which curve at a low, gradual angle away from the center line of the bus into opposite sidewalls W. Broadly, as shown in FIGS. 1 and 2, evaporative cooling systems for motor vehicles are known and conventionally comprise a circulating tank 10 with a water supply line 12 branching into distribution pipes 13 for separate housings 14 mounted on the roof R. Each housing contains fans or air blowers 16 with base mounting plates 17 and arranged in tandem to draw air through an air intake grille 20 along outer sidewall 22 of each housing 14. The air is then drawn through evaporative media in the form of a filter block 23 arranged lengthwise in closely spaced, parallel relation to the grille 20 and interiorly of the housing, as shown in FIGS. 3, 4 and 6. The desirable characteristic of the evaporative media is that it permits dispersion of the water over a relatively large surface area while maximizing the mixture of the air and water. A distribution pipe 13 traverses the entire length of each filter block and extends between the filter block and an arcuate deflector plate 24 positioned above each filter block, the distribution pipe 13 being perforated to distribute water evenly along the upper surface of the filter block media. Each evaporative media 23 is composed of a material, such as, a cellulose paper material impregnated with anti-rot salts and rigidifying saturants which will in turn distribute the water evenly throughout the cross-section of the filter block and is of a porous, sponge-like composition to permit the passage of air from the air intake grille throughout the cross-section of the block into the intake sides of the blower. The blowers direct the moisturized air downwardly through diagonally directed ducts 26 into a plenum P which extends along the upper interior of the passenger compartment C, there being a plenum P communicating with the duct on each side of the bus. Any excess water in the blocks 23 collects in the lower outside area of each housing 14 and is removed through drains D for return via lines L to the circulating tank 10.

Referring in particular to FIGS. 6 and 7, the standard bus roof structure is in the form of a hard outer shell with an inner spaced ceiling panel S conforming to the contour of the roof and provided with an insulating layer I at the inner wall surface of the ceiling panel where the plenum P is mounted. Each plenum P subtends the roof at its juncture with the sidewall W and is of generally arcuate configuration. Typically, the plenum has an inner curved wall 30 in which is mounted a series of dampers 31 at spaced intervals along the length of the plenum to regulate the volume air flow through the plenum into the bus interior. The inner curved wall 30 is joined to inner and outer sidewalls 32 and 33, respectively, and the wall 33 is fastened by rivets to the roof section at its intersection with the sidewall W of the bus. Each blower 16 has its exhaust duct 26 extending diagonally and downwardly through the housing 14 and roof R into an inlet duct 26' which extends upwardly from the sidewall 32. In addition, the mounting bracket 38 surrounds the duct 23 and firmly secures it to the ceiling panel S. The drains D extend downwardly through the thickness of the roof and ceiling sections and are connected to the return lines L within the plenum chambers.

Referring to FIGS. 3 to 7, each housing 14 is of oblong configuration elongated in the direction of the length of the bus and having opposite end walls 40, and a lid 42 is hinged to an upper divergent section 43 of inner sidewall 44. A bottom curved wall or base panel 46 conforms to the roof contour and forms a sealed lower enclosure together with the end walls 40 and sidewalls 22 and 44. The base panel 46 is affixed at opposite sides of the panel by suitable fasteners in the form of rivets 47 and 48 and has laterally spaced, longitudinally extending ribs in the form of raised upstanding pads 49 and 50 to serve as base supports for each base plate 17 of a blower assembly. By virtue of the contour of the roof and base panel, the rib 49 is of a lesser depth or more shallow than the rib 50 so that the pads are disposed in a common horizontal plane. Each base plate has attaching flanges 52 on either side which rest on the pads 49 and 50 with aligned bores through the feet 52 and pads 49 and 50 as well as reinforcing strips 54 on the undersurfaces of the pads through which suitable bolts 56 may extend and anchored by tightening nuts thereon.

In order to further rigidify the mounting of the blower 16 as well as the evaporative media or filter block 23 in each housing, an internal framework 60 is integrated into the housing structure. As best seen from a consideration of FIGS. 5 and 6, the internal framework 60 comprises elongated open rectangular side frames 62 and 63 which are joined at spaced intervals by transversely extending lower crossbraces 64 and upper crossbraces 65. The inner frame 62 is joined to the rib 50 while the outer frame is secured to the bottom panel 46 by a connecting flange 68, there being suitable fasteners extending through the connecting flange at spaced intervals to secure it to the bottom panel 46. Similarly, the bolts interconnect the bottom of the inner side frame 62 to the ribs 50. It will be noted that the lower crossbraces 64 have lateral extensions 64' continuing beyond the outer side frame member 63 and affixed to the inner surface of the sidewall 22. Vertical braces 66 are arranged at spaced intervals between the upper and lower frame members of the rectangular frames 62 and 63. An angle iron 66 extends intermediately between the side frames 62 and 63 to extend the full length of the framework and serve as a base support for one corner of the filter block 23. In this relation, the filter block 23 is preferably of generally rectangular cross-section and fits snugly between the angle iron 66 and outer side frame 63 in traversing the length of the frame 60 with the upper surface of the filter block flush with the upper surfaces of the framework as described. A wire mesh screen 80 is disposed for extension along the substantial length of the frame between the cross braces 64 inwardly of the filter block 23. The screen 80 serves as a splash guard to prevent or minimize splashing of any excess water which collects in the housing beneath the filter block. Normally, the excess water will collect along the lower outside corner of the housing over the drains D; however, when the bus is tilted or negotiating a turn, the water will flow toward the center. However, the rib 50 along with the screen 80 will minimize any tendency of the water to advance into the blower section and confine it to the outer sloped bottom section of the housing.

The deflector cap 24 rests on the upper surface of the filter block and is securely held in place by closure of the lid 42. The lid is preferably hinged at 70 to the upper edge of the divergent wall section 43 and includes a series of fasteners 71 spaced along the opposite free longitudinal edge which matingly engage complementary sockets 72, the latter mounted in an overhang 73 at the upper edge of the outer sidewall 22. The fasteners 71 include connecting pins 71' which project through mating slots in the sockets 72 and can be turned or rotated to secure the lid in place in a well-known manner. Struts 74 at opposite ends of the lid serve to support each lid 42 in a raised position when the fasteners 71 are released in order to facilitate access to the interior of the housing when desired for maintenance or service. In this relation, the divergent wall sections 43 afford sufficient clearance for individual lifting or opening of a lid 42 without interference from the other lid 42.

The air intake grille 20 along each outer sidewall 22 is preferably hinged as at 76 along its upper edge and includes a suitable screen 77 positioned within the grille section. The screen 77 can easily be serviced by lifting the air intake grille about its hinge 76 and removing the screen 77 for cleaning purposes.

Preferably, the twin housings are molded out of fiberglass, and the lower sealed enclosure of each housing is of one-piece construction, the lid 42 as well as the air intake grille 20 being separately molded and hinged in place as described. When assembled in juxtaposed relation on the roof R, as shown in FIGS. 2 and 3, the housings are positioned between sloped end wall coverings 90 in order to streamline the enclosure and lend the appearance of a single housing. The upstanding ribs serve a number of important functions as described and, briefly reviewing those functions, rigidify the entire enclosure, serve as upstanding supports for the blowers and specifically the blower motors to isolate both the isolation and noise of the motors from the passenger interior. The internal framework cooperates with the ribs in firmly supporting and attaching the blowers to the base panel as well as unifying the entire cooling system into an integrated structure with the lower sealed enclosure of the housing. As described, the framework supports the filter block along one side opposite to the blowers and the splash guard 80 is interposed along the lower frame portions between the filter block and blowers to confine the movement or spread of water along the bottom panel on the housing. In this way, the internal framework is of lightweight but sturdy construction and permits the housing itself to be made up of an extremely lightweight, thin skin material.

Accordingly, it is to be understood that while a preferred embodiment of the invention has been herein set forth and described where as modifications and changes may be made therein without departing from the spirit and scope of the invention as defined by the appended claims.

I claim:

1. In an evaporated cooling unit mounted on the roof of a motor vehicle wherein a plurality of air blowers are arranged in tandem to deliver cooled air through discharge ducts communicating with the interior of said motor vehicle, the improvement comprising:

an elongated, low-profile housing mounted on the roof of said motor vehicle and extending lengthwise thereof, said housing having a base panel conforming to the contour of the roof of said motor vehicle, said base panel including ribs having raised horizontal surfaces, said ribs projecting upwardly from said base panel and forming interruptions therein, said blowers including attaching means affixing said blowers to said ribs in spaced relation to said roof, and an internal frame member in said housing including frame supporting means cooperating with said ribs in rigidly affixing said blowers with respect to said housing.

2. In an air cooling unit according to claim 1, said attaching means including a base plate on each blower positioned on said horizontal surfaces of said ribs, and fastener elements extending through said base plate and ribs for rigidly affixing said base plate to said ribs.

3. In an air cooling unit according to claim 2, said ribs having metal reinforcing strips above and below said horizontal surfaces, and said fastener elements extending through said metal reinforcing strips and said ribs.

4. In an air cooling unit according to claim 1, said housing including said ribs being of one-piece, molded fiberglass construction.

5. In an air cooling unit according to claim 1, said cooling unit being an evaporative cooling unit including an evaporative filter, diffusers communicating with a circulating water tank, said internal frame member being of open, generally rectangular configuration having longitudinally extending, laterally spaced vertical frame portions affixed to end walls of said housing, and lower frame portions extending transversely of the length of said housing with one end of said lower frame portions affixed to an outer wall of said housing.

6. In an air cooling unit according to claim 5, one of said vertical frame portions affixed to one of said ribs.

7. In an air cooling unit according to claim 1, there being a pair of spaced parallel rib members extending lengthwise of said housing including a relatively shallow rib and a relatively deep rib, the relative depth of said rib being such that said raised horizontal surfaces are in horizontal spaced relation to one another.

8. In an evaporative cooling unit wherein an elongated housing is mounted on the roof of a motor vehicle and blower means are arranged in said housing to induce the flow of outside air into said housing through evaporative media including a filter block saturated with water to cool the air as a preliminary to delivery through air discharge ducts communicating with the interior of said motor vehicle, the improvement comprising:

said housing having a base panel substantially conforming to the contour of the roof of said motor vehicle, said base panel including raised mounting pads projecting upwardly from said base panel, said blower means including attaching means affixing said blower means to said pads in spaced relation to said roof, and an internal frame work in said housing including frame supporting means for supporting said filter block in said housing, base support means cooperating with said pads rigidly affixing said blower means to said housing, and said internal frame work being of open, generally rectangular configuration having laterally spaced vertical frame portions affixed to opposite end walls of said housing and lower frame portions extending transversely of the length of said housing with outer ends of said lower frame portions affixed to an outer side wall of said housing.

9. In an evaporative cooling unit according to claim 8, said attaching means including a base plate on each blower positioned on upper surfaces of said pads, nd fastener elements extending through said base plate and pads for rigidly affixing said base plate to said pads.

10. In an evaporative cooling unit according to claim 9, said pads having flat, raised horizontal surfaces, metal reinforcing strips above and below said mounting pads, and said fastener elements extending through said metal reinforcing strips and said ribs.

11. In an evaporative cooling unit according to claim 8, said housing including said ribs being of one-piece, molded fiberglass construction, said ribs extending lengthwise of said housing in spaced parallel relation to one another.

12. In an evaporative cooling unit according to claim 11, each of said housings including a hinged cover panel, each said evaporative media being in the form of a filter block, a horizontally extending diffuser pipe disposed over each said filter block means for supplying water to each diffuser pipe for distribution into each said filter block, a diffuser cap including a raised portion disposed over each said diffuser pipe and filter block, and means for latching said hinged cover in a closed position with respect to each said housing whereby to bear against each said diffuser cap and maintain firmly in position over said diffuser pipe and filter block.

13. In an evaporative cooling unit according to claim 8, there being a splash guard extending between said lower frame portions.

14. In an evaporative cooling unit according to claim 13, said splash guard being of a wire mesh material and extending horizontally between said lower frame portions and said filter block.

15. In an evaporative cooling unit according to claim 14, said blower means defined by a plurality of blowers arranged in tandem in each said housing intermediately between said inner sidewall and said filter block with said air discharge duct extending diagonally in a downward direction through said lower frame portion into communication with plenum areas disposed along the upper sealing area of the interior of said motor vehicle.

16. In an evaporative cooling unit wherein an elongated housing is mounted on the roof of a motor vehicle and blower means are arranged in said housing to induce the flow of outside air into said housing through evaporative media including a filter block saturated with water to cool the air as a preliminary to delivery through air discharge ducts communicating with the interior of said motor vehicle, the improvement comprising:

said housing having a base panel substantially conforming to the contour of the roof of said motor vehicle, said base panel including raised mounting pads projecting upwardly from said base panel, said blower means including attaching means affixing said blower means to said pads in spaced relation to said roof, and an internal frame work in said housing including frame supporting means for supporting said filter block in said housing, base support means cooperating with said pads in rigidly affixing said blower means to said housing, there being a pair of juxtaposed housings extending longitudinally of said motor vehicle, each said housing having inner adjacent side walls and opposed, outer side walls, and a base panel in each said housing sloping downwardly away from each said inner side wall to follow the contour of the roof of said motor vehicle.

17. In an evaporating cooling unit according to claim 16, there being a pair of spaced parallel rib members extending lengthwise of each said housing including a relatively shallow inboard rib and a relatively deep outboard rib, the relative depth of said ribs being such that said raised mounting pads are in horizontal spaced relation to one another.

* * * * *